Feb. 9, 1926.

A. B. FOWLER 1,571,936

ABRADING MACHINE

Filed Nov. 22, 1920      3 Sheets-Sheet 1

INVENTOR
Alfred B. Fowler
By his Attorney,
Nelson W. Howard

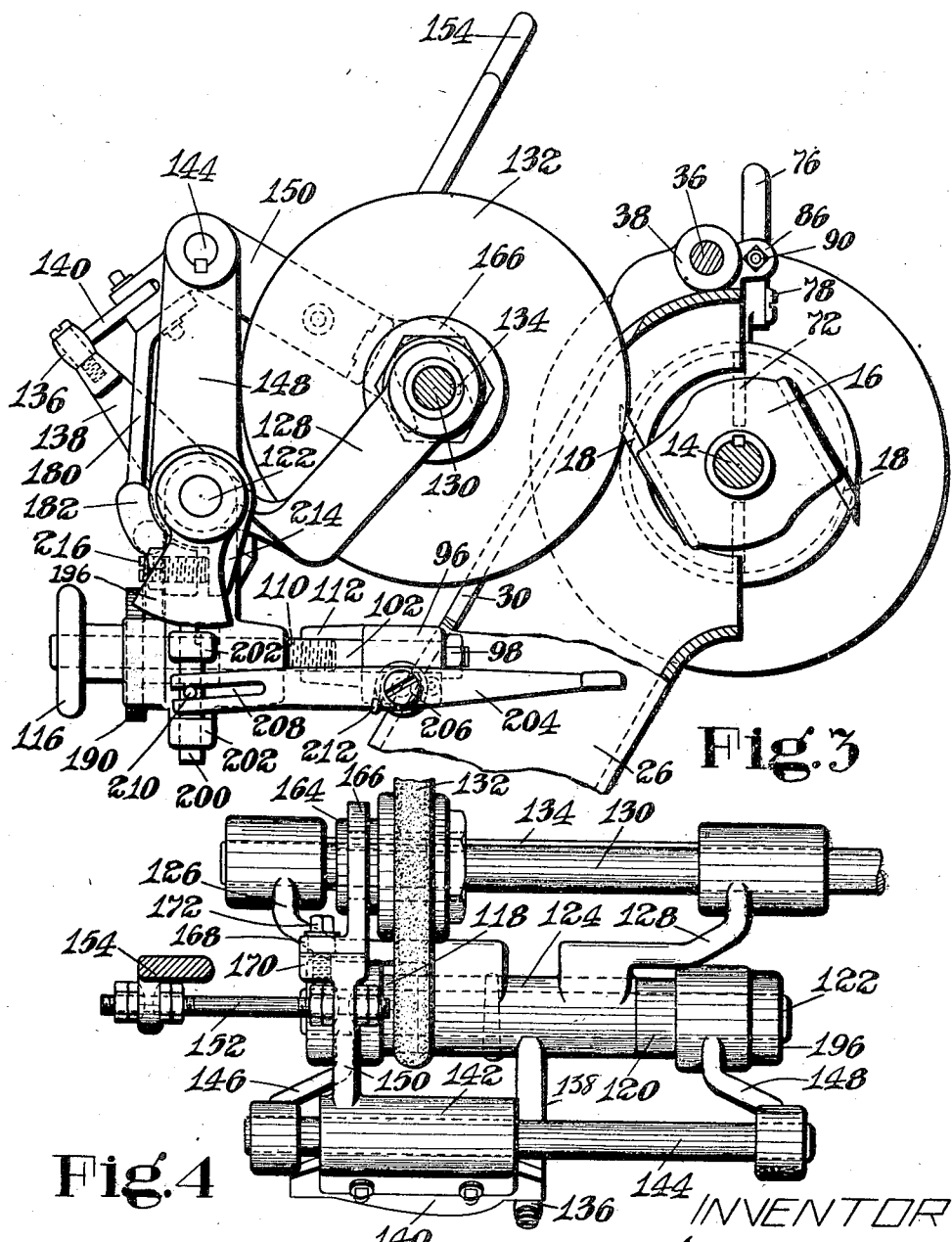

Patented Feb. 9, 1926.

1,571,936

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

ABRADING MACHINE.

Application filed November 22, 1920. Serial No. 425,755.

*To all whom it may be concern:*

Be it known that I, ALFRED B. FOWLER, a citizen of the United States, residing at Beverly, in the county of Essex and State of Massachusetts, have invented certain Improvements in Abrading Machines, of which the following description, in connection with the accompanying drawings, is a specification, like reference characters on the drawings indicating like parts in the several figures.

This invention relates to abrading machines and is herein illustrated with special reference to a machine for grinding the cutting blades of a heel trimming machine.

In sharpening tools such as, for example, the blades of a rotary heel trimming cutter, it is common practice to detach the cutter head with its blades from the drive shaft and then grind the blades in a machine which traverses the blades along a grinding wheel under control of a templet. Sometimes the individual blades are removed from the cutter head and placed in a specially constructed grinding machine intended to grind the blades exactly alike. Whatever method of grinding is adopted necessitates a considerable waste of the operator's time in removing and replacing the cutter head. If the blades are also removed from the cutter head, still more time is wasted and there is the further difficulty of replacing the blades in the cutter with their edges at the same distance from the axis of the cutter—a controlling consideration if each blade is to perform its due share of the work.

It is an object of this invention to provide an improved machine for grinding quickly and accurately cutting edges, such as required for the blades of a heel trimming machine.

A feature of the invention relates to a construction by which the blades are sharpened without disturbing their relation to the cutter head or the drive shaft, thus saving the time hitherto spent in removing them from and replacing them on the trimming machine and further facilitating the production of corresponding or duplicate edges on the blades. In the illustrative embodiment, the invention comprises an abrading tool mounted adjacent the cutter for traversing movement along the work, and a rocking frame actuated by a templet in the traversing movement of the tool for rocking the tool towards and from the work to impart a predetermined shape to the work. Preferably the traversing movement of the tool is utilized to actuate mechanism for feeding the tool toward the work. To aid in producing corresponding or duplicate blades, mechanism is provided for locking the cutter with the blades successively in the same grinding position and means is provided to traverse the abrading tool along the edge of one blade and return the tool along the same path to grind a second blade like the first.

Another feature relates to the construction of the exhaust hood by which not only the trimmings produced by the cutter but also the abrasive particles produced by the grinder are carried away. As shown, the hood is provided with a movable section to provide for access of the grinding wheel to the cutter blades and the movement of this section is preferably used to withdraw the counter guard of the cutter from the path of the grinder. The movement of this section is also utilized to control the effectiveness of the latch for locking the cutter with the blades in grinding position.

These and other features and advantages of the invention will appear from the following specification and drawings in which,—

Fig. 3 is a left hand end elevation, partly in section, showing the grinding wheel in operative position;

Fig. 4 is a top plan view of a portion of the grinding apparatus;

Figure 1:
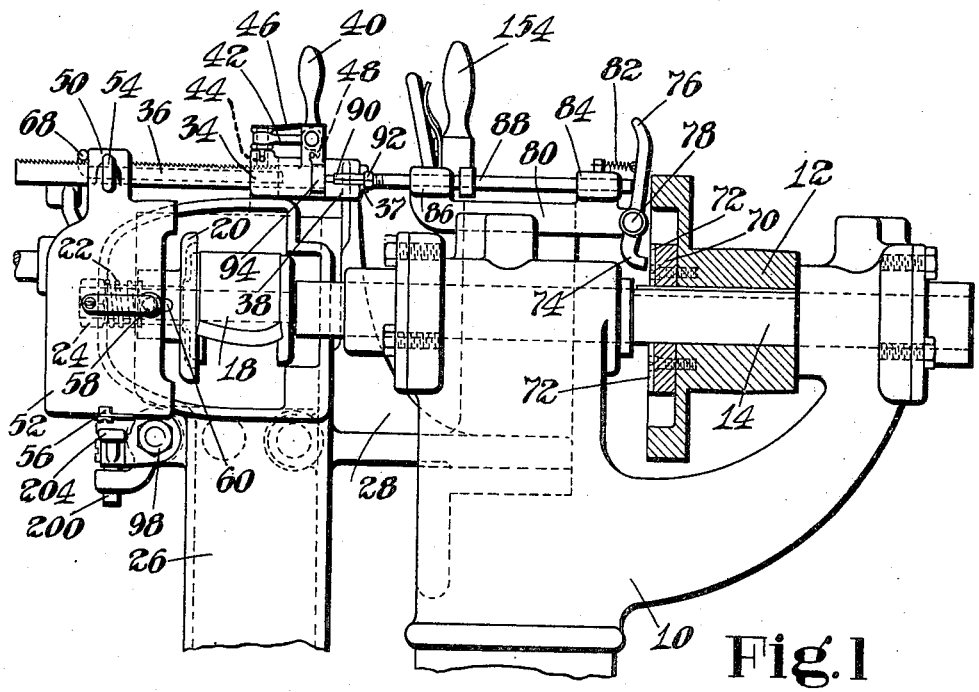
Fig. 1 is a front elevation, partly in section, with some parts removed.

In the illustrative embodiment of the invention, the grinding apparatus is shown combined with a heel trimming machine. The heel trimming machine comprises a stand 10 having bearings for the shaft 14 driven by a belt pulley 12 keyed to the shaft. At one end of the shaft is mounted the rotary head 16 of a trimming cutter having opposite blades 18 which may be mounted for simultaneous adjustment in the head and clamped in any suitable manner, not shown. Surrounding the sides of the blades is a non-rotary counter guard 20 which is pressed toward the blades by a spring 22 interposed between the hub of the counter guard and a nut 24 secured to the end of the shaft. For carrying off the trimmings produced by the cutter there is provided an exhaust hood or blower casing 26 attached by means of a bracket 28 and bolts to the stand 10.

Figure 5:
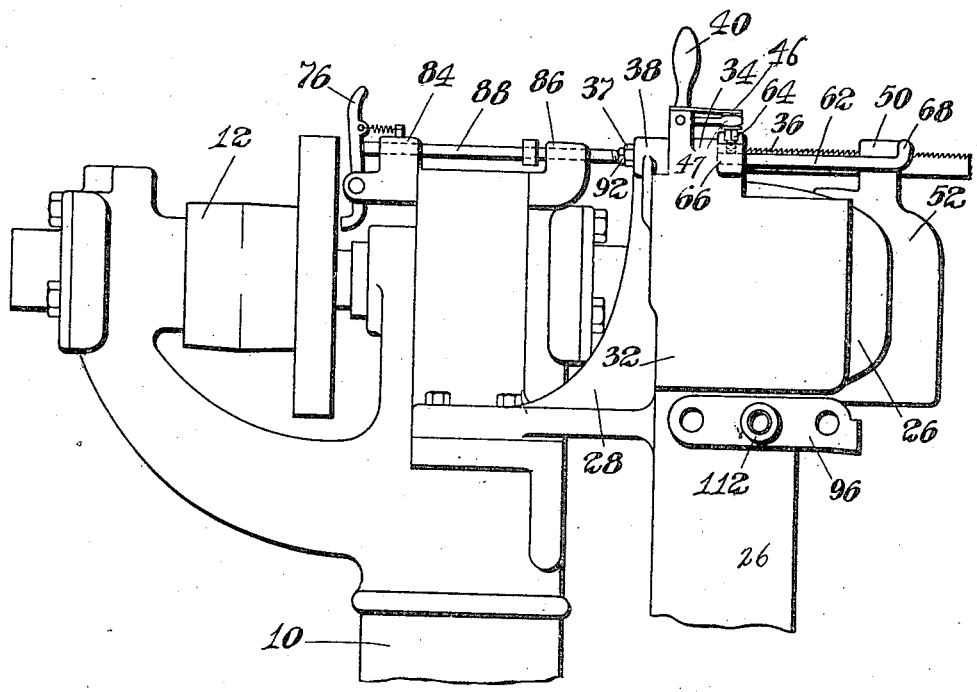
Fig. 5 is a rear elevation with the grinding apparatus removed.

The exhaust section of the hood is normally closed at the rear but to permit grinding operations a section of the hood may be moved to allow a substantial portion of the periphery of the grinding wheel to be inserted therethrough for engagement with the cutter blades. Thus the hood will serve not only to carry off the trimmings produced by the cutter, but the abrasive particles produced in grinding. This opening in the rear of the hood is indicated at 30 in Fig. 3 and the movable hood section or door 32 (Fig. 5) is provided with a sleeve 34 mounted for sliding movement on a fixed rack bar 36. The rack bar 36 is secured by the nut 37 in a fixed position on a boss 38 on an extension of the bracket 28. To slide the movable hood section 32 to provide for access of the grinding wheel to the cutter, there is pivoted on the sleeve 34 a handle 40 having a horizontal arm 42 forked to receive a grooved collar on a vertically sliding dog 44. The dog 44 is shown by dotted lines in Fig. 1, and is provided at its lower end with teeth which are complemental to the teeth of the rack bar and are adapted to engage the latter. A leaf spring 46, attached to the sleeve 34, normally holds the dog in engagement with the rack bar but to disengage the dog the handle may be swung on its pivot until a lug 48 on the handle contacts with a fixed stop on the sleeve. With the teeth of the rack bar constructed as shown in the drawings, it will be apparent that the movable hood section 32 is free to move along the bar to the right when viewed from the position shown in Fig. 5 but is prevented from moving to the left by means of the spring pressed dog 44 engaging with the vertical walls of the rack bar teeth.

Since the counter guard overlies the sides of the blades and would interfere with grinding, means is provided to slide the guard out of the way to uncover the blades. This movement of the counter guard preferably is controlled by the movement of the hood section 32. As shown, an extension 50 on a front hood section 52 is mounted for sliding movement on the rack bar 36, the hood section being guided by a wing nut 54 which passes through the extension 50 and engages a flattened surface of the rack bar. The movable hood section 52 is also guided at its lower end by a suitable guide finger 56 projecting from the fixed section of the exhaust hood 26. Projecting rearwardly from this hood section 52 is a pin 58 which enters a lost motion slot 60 in the hub of the counter guard. When moving the section 32 of the hood by means of the handle 40, the sleeve 34, near the end of its sliding movement, contacts with the projection 50 of the front section 52 and the latter, since it is connected with the counter guard by the pin 58, slides the counter guard against the tension of its spring 22 to uncover the blades 18. The sections 32 and 52 of the hood and the counter guard can then be locked in the open position by means of the dog 44 controlled by the handle 40.

When the sleeve 34 is again moved to close the hood section 32, the spring 22 automatically moves the counter guard back to its initial position and may also move the front hood section 52 to its original position. To provide a positive means, however, to restore this section to its closed position, a rod 62 is secured by the set screw 64 to an ear 66 on the sleeve 34 and one end of the rod is provided with a hook 68 which engages one side of the projection 50. This rod is of such length and the hook so disposed that the latter engages the projection just before the sleeve 34 reaches the position shown in Fig. 1 and thus slides the section 52 to normal position. This movement of the section 52 frees the counter guard so that its spring 22 becomes effective to restore it to normal position and the slot 60 allows the counter guard to yield when the cutter is used for trimming. The section 52 serves to contract the front opening of the hood in accordance with the width of the cutter to intensify the draft at the cutter.

In grinding the blades 18 it is necessary to have some means for holding the blades in a definite fixed position. Therefore, there is attached to the belt pulley 12 which drives the cutter a removable ring 70 having diametrically opposite slots 72 for engagement by a dog or latch 74 formed on the latch handle 76. The handle 76 is pivoted at 78 to a bracket 80 and a spring 82 secured to the handle and to the bracket tends to throw the dog into its operative position with respect to the slots 72. When, however, the trimming cutter is being used and the hood section 32 is closed, this dog is held out of engagement with the slots by means of a rod 88 mounted in slide bearings 84 and 86 and held against the handle 76 by means of a lug 94 on the sleeve 34 of the closed hood section 32. Thus the cutter is free to rotate in the trimming operation. To adjust the contact between this lug 94 and the rod 88 there is threaded on the latter a square contact member 90 which may be adjusted and locked by means of the nut 92. The belt on the pulley 12 or the pulley itself serves as a means to permit rotation of the cutter by hand to bring the different blades into grinding position. Although the cutter is shown as comprising two blades, it should be understood that the invention is in no way limited to this number of blades, nor in some aspects to the grinding of rotary cutter blades.

Figure 2:
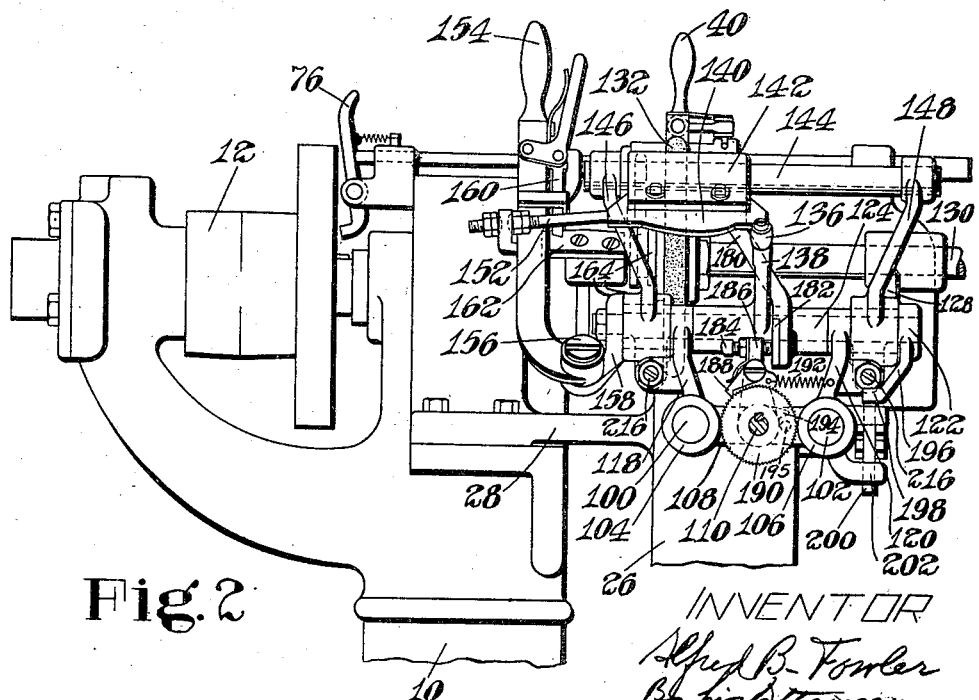
Fig. 2 is a rear elevation.

The grinding apparatus proper is mounted for sliding movement horizontally toward and from the cutter head. To support the apparatus in this movement, fixed guide rods 100 and 102 are secured to a bracket 96 on the casing 26 by means of nuts one of which is shown at 98. Slidable on these rods are two sleeves 104 and 106, respectively, connected together for simultaneous movement by a bar 108 (Fig. 2). To feed these parts along the guide rods a central feed shaft 110 is mounted rotatably in the bar 108 and is threaded into a boss 112 fixed on the bracket 96, a hand wheel 116 at the outer end of the feed shaft serving to control the feed by hand when desired. Extending upwardly from the sleeves 104 and 106 are two arms 118 and 120, respectively, which support a rock shaft 122 which forms the axis on which the grinding wheel oscillates under the influence of a templet. The rocking frame which supports the grinding wheel comprises a sleeve 124 pinned to the rod 122 and having supporting arms 126 and 128 for the grinding wheel shaft 130 and an arm 138 controlled by a movable templet. The grinding wheel 132 is mounted for axial movement on the shaft 130 and is splined thereto by means of a key 134. The shaft 130 constitutes the drive shaft of the grinder and may be connected to any suitable source of supply as, for example, to a motor mounted to swing with the shaft about the axis of the rod 122. The grinding wheel is caused to oscillate in its axial movement by means of a connected templet 140 which slides along a roller or follower 136 on the arm 138 of the sleeve 124, the weight of the wheel holding the roller against the templet. As shown clearly in Fig. 3, the point of contact between the templet 140 and the follower 136 is located much nearer the rod 122 than the point on the periphery of the wheel 132 which is in grinding contact with the work, thus causing said point on the grinding wheel to be moved through a greater distance than the follower 136 and thus enabling the curvature of the templet to be made flatter than the curve to be produced upon the work. This is desirable inasmuch as the follower is thus enabled to ride more easily over the templet and more accurate results are obtained. The templet 140 is secured to a sleeve 142 which is mounted for sliding movement upon a guide rod 144 supported in arms 146 and 148 mounted on the rod 122.

To slide both the grinding wheel and the templet together, there projects forwardly from the sleeve 142 a bar 150 to which is attached a link 152. The other end of the link is connected to an operating lever 154 pivoted at 156 to a bracket 158 hung on the rod 122. The link 152 should have at both ends a ball and socket or other universal connection to allow for the swinging of the templet, grinding wheel, and associated parts when they are moved from the operative to the inoperative position as will be later described. The handle 154 can be locked in position by means of a spring pressed pawl 160 which engages a slotted plate 162 on the framework. To allow the grinding wheel to rock relatively to the templet as the wheel slides along the drive shaft 130 it has a grooved collar 164 with which engages a forked arm 166 secured by means of the interengaging lugs 168 and 170 to the bar 150. The lugs are secured together by an adjusting screw 172 and a slight relative movement of these lugs provides for adjustment of the wheels with reference to the templet.

To provide for automatic feeding of the grinding wheel toward the work at the end of the traversing movement along the blade, an arm 180 (Fig. 3) is secured to the templet holding sleeve 142 and has a contact member 182 at its lower end which contacts with a screw 184 (Fig. 2) on a lever 186 loose on the feed shaft 110. The lever has a spring pressed pawl 188 for engagement with a ratchet 190 keyed to the feed shaft and a spring 192 advances the lever and pawl to secure a new grip on the ratchet when the grinding wheel is moved to the right from the position shown in Fig. 2. When the grinding wheel is moved to the right, the lever 186 is moved to the right under the influence of the spring 192 until the stop 194 on the lever engages a fixed stop 195 on the bar 108. Thereafter, when the grinding wheel returns and approaches its original position, the contact member 182 strikes the screw 184 and advances the ratchet one tooth and thus rotates the feed shaft 110. It is apparent that by varying the adjustment of the screw 184 within the lever 186 the length of effective stroke of the screw may be varied to vary the distance through which the ratchet wheel is rotated by the pawl and thus to control the amount of feed toward the blade during the traversements.

As shown in Fig. 3, the grinding wheel is in contact with the edge of the cutter blade and the hood section 32 is in open position. To swing the grinding wheel and the associated parts out of the casing, the arms 146 and 148 can be rocked on the rod 122 to a limited extent. The arm 148 is integrally connected to a lower arm 196 to form a lever which can be locked in position to hold the grinding apparatus in an inoperative position. As shown, the arm 196 has a horizontal extension 198 (Fig. 2) lying in the path of a latch bolt 200 slidable in bearings 202. The latch bolt is controlled by means of a lever 204 pivoted at 206 and having a forked end 208 which engages a pin 210 in the latch bolt. A spring 212 normally throws the latch bolt upwardly to engage behind the horizontal extension 198 on the arm 196. To support the grinding wheel adjustably in a preliminary grinding position as shown in Fig. 3, there project downwardly from the arms 146 and 148 lugs 214 for engagement with stop screws 216 adjustably fixed on the arms 118 and 120.

In operation, the movable hood section 32 is first opened by manipulation of the handle 40. As the sleeve 34 slides along the rack bar, the lug 94 moves out from engagement with the contact member 90 on the end of the rod 88 and the spring 82 renders the dog 74 effective to hold a blade 18 of the rotary cutter in the desired angular position. Near the end of the opening movement of the hood section, the sleeve 34 engages the projection 50 and withdraws the counter guard from over the sides of the blades. With one of the blades fixed in position, the operator grasps the handle 154 and slides the templet and the grinding wheel to the right as shown in Figs. 2 and 4 to carry the grinding wheel along the edge of the blade. During this traverse, the templet causes the grinding wheel to rock on the axis 122 to impart the desired shape to the blade. With the grinding wheel at the end of this stroke, the cutter is rotated to bring the next blade to the same position formerly occupied by the first blade and the handle 154 is again manipulated to carry the grinding wheel back along the same path to grind the second blade like the first. As the grinding wheel approaches its original position, the contact member 182 engages the screw 184 on the ratchet lever 186 and causes the apparatus to be fed toward the cutter for a new cut. With this new feed, the operator then goes back along the edge of the second blade and then again reverses the cutter to bring the next blade to grinding position. When the grinding is completed, the grinding wheel and associated parts are swung about the rod 122 and locked in raised position by means of the sliding bolt 200. The hood sections 32 and 52 are then closed by means of the handle 40 and the counter guard comes back to its original position automatically. The lug 94 on the sleeve 34 again engages the contact member 90 on the end of the rod 88 and renders the dog 74 again inoperative. Thus the machine is again ready for a trimming operation.

Although the invention has been shown as embodied in a particular machine, it should be understood that this is for illustrative purposes only and that the invention is in no way limited to the precise details shown and described.

Having thus described my invention, what I claim as new and desire to secure by Letters Patent of the United States is:

1. In a grinding machine, an abrading tool mounted for traversing movement along the work, and means including a templet actuated by the traversing movement of the tool for rocking the tool towards and from the work to impart a predetermined shape to the work.

2. In a grinding machine, an abrading tool mounted for traversing movement along the work, a rocking frame to support the abrading tool, and means including a templet for rocking the frame to cause the tool to impart a predetermined shape to the work, the templet being located nearer the axis about which said frame is rocked than is the point of contact of said tool with the work.

3. In a grinding machine, an abrading tool mounted for rocking movement and for traversing movement along the work, and means, including a templet, for rocking the abrading tool to impart a predetermined shape to the work, the templet being located between the axis of said rocking movement and the point of contact of said tool with the work.

4. In a grinding machine, a slidably mounted grinding tool, a slidably mounted templet having a loose connection with the grinding tool to slide with the latter, and means engaging the templet for rocking the grinding tool as it slides to impart a predetermined shape to the work.

5. In a grinding machine, an abrading tool mounted for traversing movement along the work, a rocking frame to support the abrading tool, a templet for controlling the rocking movement of the frame, and means for actuating the abrading tool and the templet in unison to cause rocking movement of the tool relatively to the templet to impart a predetermined shape to the work.

6. In a grinding machine, a rocking frame, a shaft carried thereby, a grinding tool movable on the shaft, a templet, means for sliding the grinding wheel and templet, and means carried by the rocking frame for engagement with the templet to rock the grinding wheel as it slides along the work, said means being nearer the axis of rocking movement of the frame than said shaft.

7. In a grinding machine, a rocking frame, a driving shaft journaled in said frame and arranged parallel to the axis of said rocking movement, a grinding wheel splined on the shaft, a templet mounted to slide with the grinding wheel, and a follower on the rocking frame for engaging the templet to rock the grinding wheel to impart the desired shape to the work.

8. In a grinding machine, a driving shaft, a grinding wheel mounted to slide axially on said shaft, a templet mounted to slide with the wheel, a frame rockable about an axis parallel to said shaft for supporting said shaft, and a follower on the support for engagement with the movable templet to rock the wheel as it slides to impart a predetermined shape to the work.

9. In a grinding machine, a rocking frame, a shaft carried by the frame, an abrading tool slidable on the shaft, a guide rod, a templet slidable on the rod, means to slide the tool and the templet simultaneously, and a follower carried by the rocking frame to engage the templet and rock the tool relatively to the guide rod to impart a predetermined shape to the work.

10. In a grinding machine, a rocking frame, a driving shaft carried by the frame, an abrading tool splined on the shaft, a guide rod, a templet slidable on the rod, a follower on the rocking frame for cooperation with the templet, a forked arm connected to the templet and loosely engaging the abrading tool, and a lever connected to the arm for sliding the tool and moving the templet across the follower to rock the tool in grinding.

11. In a grinding machine, a rock shaft, a rocking frame carried thereby to support an abrading tool, a guide rod, a templet mounted on the rod, means carried by the rocking frame for engaging the templet to rock the tool, a lever pivoted on the rock shaft for supporting the guide rod, means to support the abrading tool in a preliminary grinding position, and a latch for the lever to hold the abrading tool in an out-of-the-way position.

12. In a grinding machine, an abrading tool mounted for reciprocation along the work, and means actuated by the reciprocating movement of the tool for feeding the tool towards the work to enable the tool to cut more deeply into the work upon its succeeding stroke.

13. In a grinding machine, an abrading tool mounted for traversing movement along the work, means for rocking the tool towards and from the work to impart a predetermined shape to the work, and means actuated by the traversing movement of the tool for feeding the tool towards the work to regulate the depth of cut.

14. In a grinding machine, an abrading tool mounted for reciprocation along the work, means for rocking the tool towards and from the work to impart a predetermined shape to the work, means for feeding the tool toward the work and mechanism operable at the end of the reciprocating movement of the tool for actuating said feeding means.

15. In a machine for grinding a cutter having a plurality of blades, an abrading tool, means for moving the abrading tool along one of the blades to grind the edge and for reversing the movement of the abrading tool to grind a second blade like the first, and means actuated only by the reverse movement of the abrading tool for feeding the tool toward the work.

16. In a machine for grinding a cutter having a plurality of blades, an abrading tool, means for moving the abrading tool along one of the blades to grind the edge and for reversing the movement of the abrading tool to grind a second blade like the first, and means actuated by the reversing movement of the abrading tool for feeding the tool towards the work in preparation for a second grinding of the second blade.

17. In a machine for grinding a cutter having a plurality of blades, an abrading tool mounted for movement along one of the blades to grind the edge, means for rotating the cutter to bring another blade to grinding position, means for returning the abrading tool to its original position along the same path to grind the second blade like the first, and automatically operated means for causing said tool to travel in a different path upon its next grinding movement.

18. In a machine for grinding a cutter having a plurality of blades, a reciprocatory abrading tool mounted for movement along one of the blades to grind the edge, means for rotating the cutter to bring another blade to grinding position, means for locking the cutter with the second blade in the grinding position, means for reversing the movement of the abrading tool to grind the second blade, and means actuated by said reverse movement for causing said tool to cut more deeply into the second blade upon its succeeding stroke.

19. In a machine for grinding a cutter having a plurality of blades, an exhaust hood having an opening, a movable closure for said opening, an abrading tool movable through said opening to engage the work, means for fixing the angular position of one of the blades for grinding, means for causing relative movement between the blade and the abrading tool to grind the entire edge of the blade, means rendered operative by movement of said closure for locating a second blade in the same position formerly occupied by the first blade, and means for reversing the relative movement between the blade and the abrading tool to grind the edge of the second blade like the first.

20. In a machine for grinding a cutter having a plurality of blades, a shaft to one end of which the cutter is secured, an abrading tool mounted for movement along the edges of the blades, a slotted member secured to said shaft at the opposite side of the machine from said cutter, a latch for engagement with the slots in said member to lock the blades successively in the same position for grinding, and means operable from the vicinity of the cutter for releasing said latch.

21. In a machine for grinding a cutter, in combination, a grinding tool, and an exhaust hood enclosing the portion of the cutter being operated upon and the portion of the tool operating upon the cutter for carrying off both the trimmings produced by the cutter on the work and the abrasive particles produced by the grinding tool when grinding the cutter.

22. In a grinding machine, in combination, an exhaust hood, a grinding tool, means for maintaining the tool in a grinding position to utilize the hood for carrying away the abrasive particles, and means for supporting the grinding tool in an out-of-the-way position outside the hood to enable the hood to be used in another operation.

23. In a machine for grinding cutting edges, an exhaust hood having an opening, a grinding tool mounted to move through the opening to engage the work, an adjustable closure for the opening in the hood, and means for locking the closure at any point throughout its adjustment.

24. In a machine for grinding the blades of a cutter, an exhaust hood to remove the trimmings produced by cutting, an abrasive tool mounted for movement towards the cutter, a guide bar, means for adjusting a section of the hood along the bar to provide for access of the abrading tool to the cutter, and means for locking the movable section at any point throughout its adjustment.

25. In a machine for grinding cutting edges, a grinding tool, an exhaust hood having an opening, and a movable section to cover said opening and to provide for access of the grinding tool to the cutting edges, said exhaust hood being constructed and arranged entirely to enclose the cutter blade during the grinding operations thereon and to enclose also a substantial portion of the periphery of the grinding tool adjacent to the point of grinding contact.

26. In a machine for grinding the blades of a rotary cutter having a movable counter guard, an abrading tool mounted adjacent to the cutter for grinding the cutter blades, and means for moving the counter guard out of the way of the abrading tool when grinding the cutter blades.

27. In a machine for grinding the blades of a rotary cutter having a spring pressed counter guard, an abrading tool mounted adjacent the cutter for grinding the cutter blades, means for moving the counter guard out of the way of the abrading tool when grinding the cutter blades, and means for locking the counter guard in the withdrawn position against the tension of its spring.

28. In a machine for grinding the blades of a rotary cutter having a movable counter guard, an exhaust hood, an abrading tool mounted for movement towards the cutter, means for moving a section of the hood to provide for access of the abrading tool to the cutter and for moving the counter guard out of the path of the abrading tool when the cutter is to be ground.

29. In a machine for grinding the blades of a rotary cutter having a movable counter guard, an exhaust hood, an abrading tool mounted for movement towards the cutter, means for moving a section of the hood to provide for access of the abrading tool to the cutter, and a lost motion connection between the moving means and the counter guard to move the latter out of the path of the abrading tool when the cutter is to be ground.

30. In a machine for grinding the blades of a rotary cutter having a spring pressed counter guard, an exhaust hood formed in sections, an abrading tool mounted for movement towards the cutter, means for moving a section of the hood out of the path of the abrading tool when the cutter is to be ground, means for moving the spring pressed counter guard away from the cutter to uncover the blades for grinding, and means for locking the counter guard in the withdrawn position against the tension of its spring.

31. In a machine for grinding a cutter having a plurality of blades, an exhaust hood, an abrading tool, means for moving a section of the hood to provide for access of the tool to the cutter, and locking means for the cutter controlled by the movement of the section.

32. In a machine for grinding a cutter having a plurality of blades, an exhaust hood, an abrading tool, means for moving a section of the hood to provide for access of the tool to the cutter, a spring pressed latch for locking the cutter, a rod engaging the latch and constructed and arranged for actuation by the movable section of the hood to control the effectiveness of the latch.

In testimony whereof I have signed my name to this specification.

ALFRED B. FOWLER.